United States Patent
Yu et al.

(10) Patent No.: US 12,111,227 B2
(45) Date of Patent: Oct. 8, 2024

(54) VEHICLE DATA COMMUNICATION AND INTERACTION SYSTEM AND CONSTRUCTION METHOD THEREOF

(71) Applicant: TONGJI UNIVERSITY, Shanghai (CN)

(72) Inventors: Zhuoping Yu, Shanghai (CN); Lu Xiong, Shanghai (CN); Xichan Zhu, Shanghai (CN); Gang Xu, Shanghai (CN); Biao Wu, Shanghai (CN)

(73) Assignee: TONGJI UNIVERSITY, Shanghai (CN)

(*) Notice: Subject to any disclaimer, the term of this patent is extended or adjusted under 35 U.S.C. 154(b) by 288 days.

(21) Appl. No.: 17/761,597

(22) PCT Filed: Oct. 28, 2020

(86) PCT No.: PCT/CN2020/124194
§ 371 (c)(1),
(2) Date: Mar. 18, 2022

(87) PCT Pub. No.: WO2021/103903
PCT Pub. Date: Jun. 3, 2021

(65) Prior Publication Data
US 2022/0381649 A1    Dec. 1, 2022

(30) Foreign Application Priority Data
Nov. 28, 2019 (CN) .......................... 201911187768.3

(51) Int. Cl.
*G01M 17/007* (2006.01)

(52) U.S. Cl.
CPC .............................. *G01M 17/007* (2013.01)

(58) Field of Classification Search
None
See application file for complete search history.

(56) References Cited

U.S. PATENT DOCUMENTS

| | | | |
|---|---|---|---|
| 8,640,533 B2* | 2/2014 | Andersen | B60T 13/263 73/129 |
| 2014/0200760 A1* | 7/2014 | Kaufmann | G08G 1/162 701/29.3 |
| 2018/0314255 A1* | 11/2018 | Nistler | G01M 17/08 |
| 2019/0221057 A1* | 7/2019 | Shibata | H04W 4/48 |

* cited by examiner

*Primary Examiner* — James M McPherson
(74) *Attorney, Agent, or Firm* — JCIP GLOBAL INC.

(57) ABSTRACT

The present invention relates to a vehicle data communication and interaction system and a construction method thereof. The system includes a first test vehicle placed in an environment perception test platform and a second test vehicle placed in a rotating hub test platform, an intelligent-electronic control unit (i-ECU), a vehicle control unit (VCU), and a vehicle bottom electronic control unit that are communicatively connected with each other are mounted on each of the first test vehicle and the second test vehicle, and a sensor is further mounted on the first test vehicle. The first test vehicle is communicatively connected to the second test vehicle, and specifically, the VCU or a network gateway is connected via the sensor, to implement a communication connection between the two test vehicles.

3 Claims, 4 Drawing Sheets

VEHICLE DATA COMMUNICATION AND INTERACTION SYSTEM AND CONSTRUCTION METHOD THEREOF

CROSS-REFERENCE TO RELATED APPLICATION

This application is a 371 of international application of PCT application serial no. PCT/CN2020/124194, filed on Oct. 28, 2020, which claims the priority benefit of China application no. 201911187768.3, filed on Nov. 28, 2019. The entirety of each of the above mentioned patent applications is hereby incorporated by reference herein and made a part of this specification.

TECHNICAL FIELD

The present invention relates to the field of vehicle electronic data interaction technologies, and in particular, to a vehicle data communication and interaction system and a construction method thereof.

RELATED ART

An intelligent-vehicle-in-the-loop (i-VIL) system is a vehicle test system between a virtual test and a real vehicle road test and has the characteristics of high controllability, high efficiency, and high repeatability, and can meet test requirements of complex working conditions such as a high-risk scene test and an error tolerance test. The i-VIL system converts a relatively high absolute speed of a vehicle into a relatively low relative speed between vehicles through a rotating hub, to implement a high-speed test of the vehicle safely and efficiently. The working principle of the i-VIL system is to respectively place two test vehicles on a rotating hub test platform and an environment perception test platform, the test vehicle on the rotating hub test platform is responsible for driving and braking operations of the vehicle, and the test vehicle on the environment perception test platform is responsible to a steering operation of the vehicle and detection of a road environment, so that complete and real-time vehicle operation control is implemented by combining the operations of the two test vehicles.

Compared with a conventional hardware-in-the-loop (HIL) test, because the i-VIL system replaces a vehicle model with a real vehicle, the accuracy of a performance test result of a tested controller is greatly improved. However, to ensure the accuracy of the test result, it is usually necessary to accurately and efficiently perform data communication and interaction between test vehicles, especially for intelligent driving vehicles, due to a complex integrated electronic system thereof, the real-time performance of data communication and interaction cannot be ensured, resulting in poor complete full-vehicle performance and real-time operation response performance of the test vehicles.

SUMMARY

An objective of the present invention is to provide a vehicle data communication and interaction system and a construction method thereof to overcome the defects in the related art, so as to achieve real-time performance and high efficiency of data interaction in a full vehicle-in-loop test system of an intelligent vehicle.

The objective of the present invention may be achieved through the following technical solutions. A vehicle data communication and interaction system is provided, including a first test vehicle placed in an environment perception test platform and a second test vehicle placed in a rotating hub test platform, an intelligent-electronic control unit (i-ECU), a vehicle control unit (VCU), and a vehicle bottom electronic control unit that are communicatively connected with each other are mounted on each of the first test vehicle and the second test vehicle, a sensor is mounted on the first test vehicle, and the first test vehicle is communicatively connected to the second test vehicle.

Further, the vehicle bottom electronic control unit includes: an engine control module (ECU), a transmission control unit (TCU), an electric power steering (EPS) system, and a stabilization control system (SCS), the ECM and the TCU are connected to a first communication bus, the EPS system and the SCS are connected to a second communication bus, the first communication bus is communicatively connected to the second communication bus via the VCU, and the VCU is communicatively connected to the i-ECU.

Further, the sensor is communicatively connected to the i-ECUs on the first test vehicle and the second test vehicle respectively, and the second communication bus of the first test vehicle is connected to the second communication bus of the second test vehicle.

Further, a network gateway is mounted on the first test vehicle, a first end of the network gateway is connected between the VCU of the first test vehicle and the first communication bus, a second end of the network gateway is connected between the VCU of the first test vehicle and the second communication bus, a third end of the network gateway is connected to the first communication bus of the second test vehicle, and a fourth end of the network gateway is connected to the second communication bus of the second test vehicle.

Further, a network gateway is mounted on the second test vehicle, a first end of the network gateway is connected between the VCU of the first test vehicle and the first communication bus, a second end of the network gateway is connected between the VCU of the first test vehicle and the second communication bus, a third end of the network gateway is connected to the first communication bus of the second test vehicle, and a fourth end of the network gateway is connected to the second communication bus of the second test vehicle.

A construction method for a vehicle data communication and interaction system is provided, including the following steps:

S1: respectively mounting a first test vehicle and a second test vehicle on an environment perception test platform and a rotating hub test platform, where an i-ECU, a VCU, an ECM, a TCU, an EPS system, and an SCS that are communicatively connected with each other are mounted on each of the first test vehicle and the second test vehicle, the ECM, the TCU, the EPS system, and the SCS are jointly connected to form a vehicle controller local area network bus, the vehicle controller local area network bus is connected to the VCU, the VCU is further connected to the i-ECU, and a sensor connected to the i-ECU on the first test vehicle is further mounted on the first test vehicle;

S2: cutting off the connection between the sensor on the first test vehicle and the i-ECU on the first test vehicle, and connecting the sensor on the first test vehicle to the i-ECU on the second test vehicle;

S3: cutting off the connection between the vehicle controller local area network bus on the first test vehicle and the VCU on the first test vehicle, and connecting the EPS system on the first test vehicle to the vehicle controller local area network bus on the second test vehicle; and S4: cutting off the connection with the EPS system in the vehicle controller local area network bus on the second test vehicle, to obtain a vehicle data communication and interaction system.

Further, the vehicle controller local area network bus includes a first communication bus and a second communication bus, the first communication bus is respectively connected to the ECM and the TCU, the second communication bus is respectively connected to the EPS system and the SCS, and the first communication bus and the second communication bus are further respectively connected to the VCU.

Further, in the step S3, the EPS system on the first test vehicle is connected to the vehicle controller local area network bus on the second test vehicle in a wired or wireless manner.

A construction method for a vehicle data communication and interaction system is provided, including the following steps:

S1: respectively mounting a first test vehicle and a second test vehicle on an environment perception test platform and a rotating hub test platform, where an i-ECU, a VCU, an ECM, a TCU, an EPS system, and an SCS that are communicatively connected with each other are mounted on each of the first test vehicle and the second test vehicle, the ECM, the TCU, the EPS system, and the SCS are jointly connected to form a vehicle controller local area network bus, the vehicle controller local area network bus is connected to the VCU, the VCU is further connected to the i-ECU, and a sensor connected to the i-ECU on the first test vehicle is further mounted on the first test vehicle;

S2: cutting off the connection with the ECM, the TCU, and the SCS in the vehicle controller local area network bus on the first test vehicle, cutting off the connection between the vehicle controller local area network bus on the second test vehicle and the VCU on the second test vehicle, and cutting off the connection with the EPS system in the vehicle controller local area network bus on the second test vehicle; and S3: mounting a network gateway on the first test vehicle or the second test vehicle, connecting one end of the network gateway to the VCU of the first test vehicle, and connecting another end of the network gateway to the vehicle controller local area network bus on the second test vehicle, to obtain a vehicle data communication and interaction system.

Further, the vehicle controller local area network bus includes a first communication bus and a second communication bus, the first communication bus is respectively connected to the ECM and the TCU, the second communication bus is respectively connected to the EPS system and the SCS, and the first communication bus and the second communication bus are further respectively connected to the VCU; and in the step S3, one end of the network gateway is respectively connected between the VCU of the first test vehicle and the first communication bus and between the VCU of the first test vehicle and the second communication bus, and another end of the network gateway is respectively connected to the first communication bus and the second communication bus of the second test vehicle.

Compared with the related art, in the present invention, a vehicle data communication and interaction system is constructed in two connection manners: one is that a VCU is connected to a sensor between test vehicles, and the other is that the VCU is connected to a vehicle bottom electronic control unit between the test vehicles via a network gateway. In addition, the vehicle bottom electronic control unit is connected to form a vehicle controller local area network bus, to simplify the complexity of the connection between the VCU and the vehicle bottom electronic control unit, so that information data can be efficiently transmitted and interacted between the test vehicles in real time, to ensure accurate and synchronization of the information of the test vehicles, thereby efficiently improving full vehicle complete performance and real-time operation response performance of the vehicle during test.

DESCRIPTION OF EMBODIMENTS

The present invention is described in detail below with reference to the accompanying drawings and specific embodiments.

Embodiment 1

Figure 1:
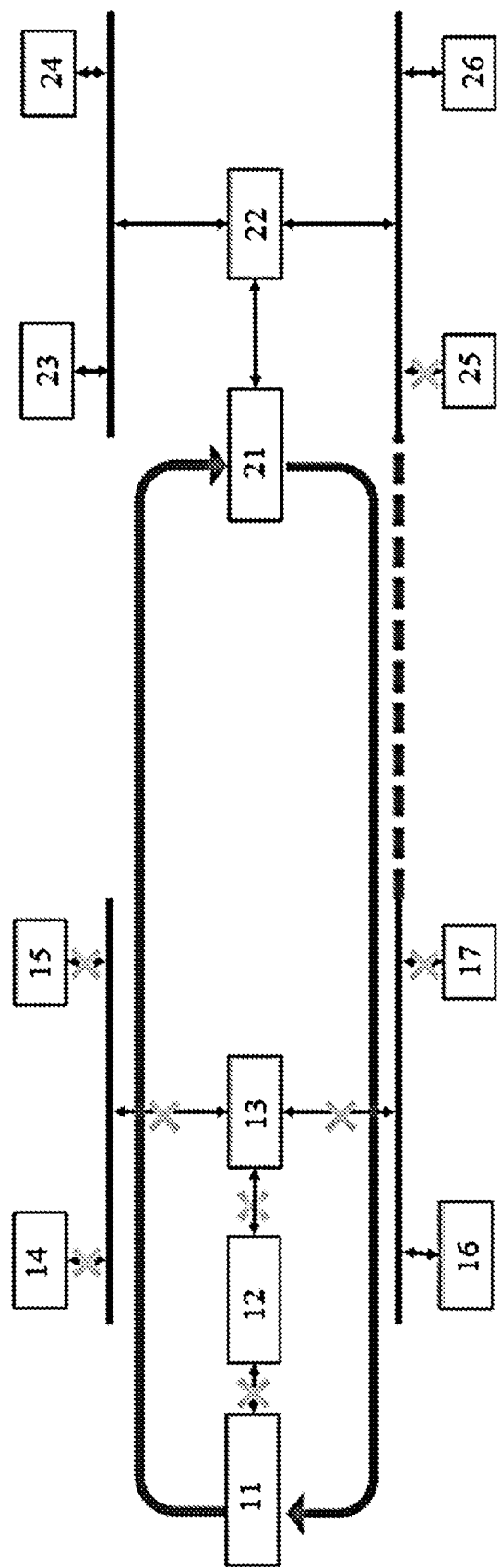
FIG. 1 is a schematic structural diagram of a vehicle data communication and interaction system according to Embodiment 1.

As shown in FIG. 1, a vehicle data communication and interaction system is provided, including a first test vehicle placed in an environment perception test platform and a second test vehicle placed in a rotating hub test platform, an i-ECU, a VCU, and a vehicle bottom electronic control unit that are communicatively connected with each other are mounted on each of the first test vehicle and the second test vehicle, the first test vehicle is communicatively connected to the second test vehicle, and the vehicle bottom electronic control unit includes an ECM, a TCU, an EPS system, and an SCS.

Specifically, a sensor 11, a first i-ECU 12, a first VCU 13, a first ECM 14, a first TCU 15, a first EPS system 16, and a first SCS 17 are mounted on the first test vehicle, where the sensor 11, the first i-ECU 12, and the first VCU 13 are connected with each other in sequence, the first ECM 14 and the first TCU 15 are connected to the same communication bus and then are connected to the first VCU 13, and the first EPS system 16 and the first SCS 17 are connected to the same communication bus and then are connected to the first VCU 13.

A second i-ECU 21, a second VCU 22, a second ECM 23, a second TCU 24, a second EPS system 25, and a second SCS 26 are mounted on the second test vehicle, where the second i-ECU 21 is connected to the second VCU 22, the second ECM 23 and the second TCU 24 are connected to the same communication bus and then are connected to the second VCU 22, and the second EPS system 25 and the second SCS 26 are connected to the same communication bus and then are connected to the second VCU 22.

The sensor 11 is further communicatively connected to the second i-ECU 21, and the communication bus connected to the first EPS system 16 and the first SCS 17 is connected to the communication bus connected to the second EPS system 25 and the second SCS 26.

Figure 2:
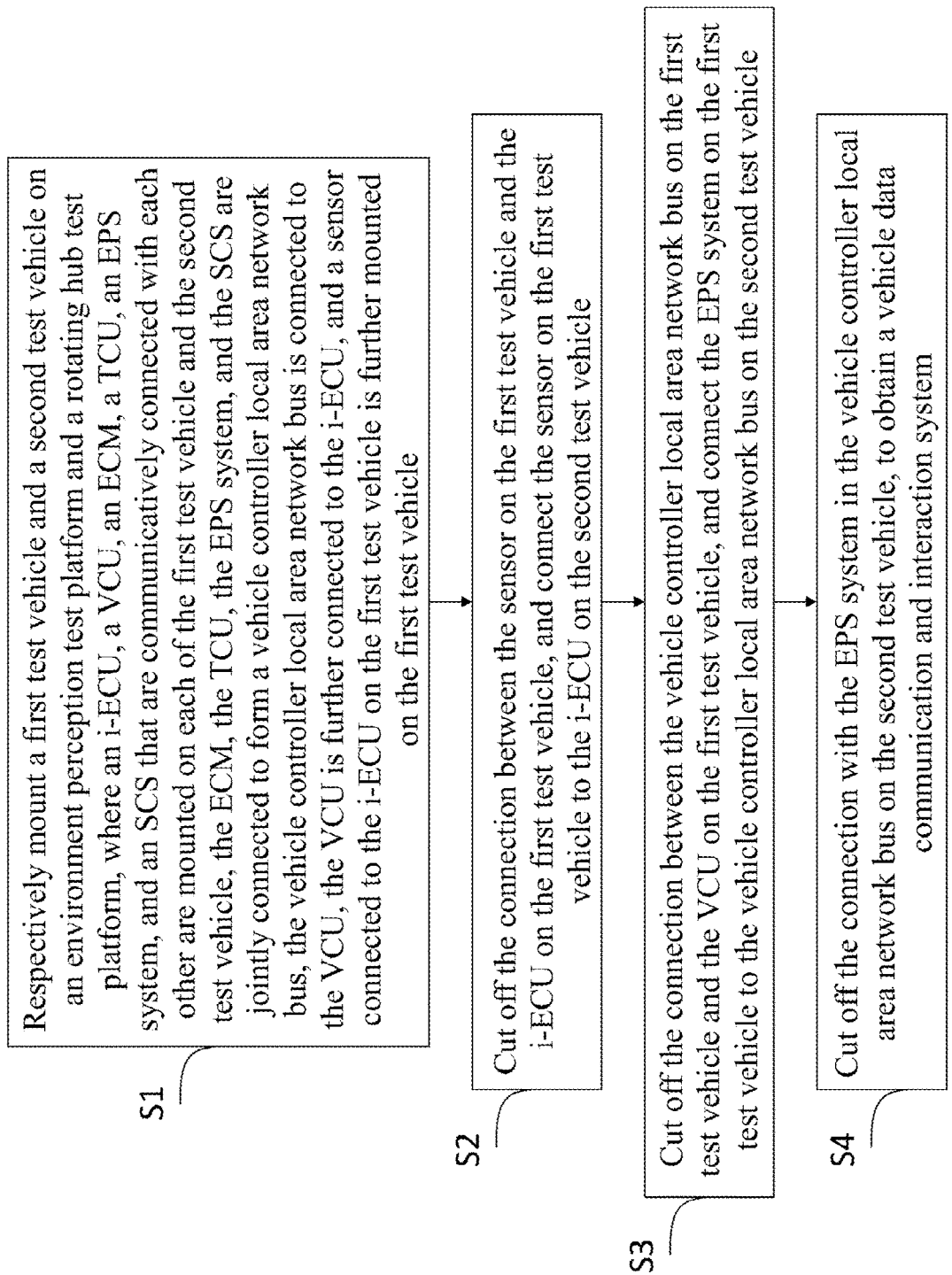
FIG. 2 is a schematic flowchart of a construction method for a vehicle data communication and interaction system according to Embodiment 1.

A flowchart of the construction method for a vehicle data communication and interaction system is shown in FIG. 2 and mainly includes the following steps.

S1. Respectively mount a first test vehicle and a second test vehicle on an environment perception test platform and a rotating hub test platform, where an i-ECU, a VCU, an ECM, a TCU, an EPS system, and an SCS that are communicatively connected with each other are mounted on each of the first test vehicle and the second test vehicle, the ECM, the TCU, the EPS system, and the SCS are jointly connected to form a vehicle controller local area network bus, the vehicle controller local area network bus is connected to the VCU, the VCU is further connected to the i-ECU, and a sensor connected to the i-ECU on the first test vehicle is further mounted on the first test vehicle.

S2. Cut off the connection between the sensor on the first test vehicle and the i-ECU on the first test vehicle, and connect the sensor on the first test vehicle to the i-ECU on the second test vehicle.

S3. Cut off the connection between the vehicle controller local area network bus on the first test vehicle and the VCU on the first test vehicle, and connect the EPS system on the first test vehicle to the vehicle controller local area network bus on the second test vehicle.

S4. Cut off the connection with the EPS system in the vehicle controller local area network bus on the second test vehicle, to obtain a vehicle data communication and interaction system.

A working process of applying the method in this embodiment is as follows.

(1) Test vehicles are respectively placed on an environment perception test platform and a rotating hub test platform, where each test vehicle includes an i-ECU, a VCU, an ECM, a TCU, an EPS system, and an SCS, which are respectively a first i-ECU 12, a first VCU 13, a first ECM 14, a first TCU 15, a first EPS system 16, and a first SCS 17 on the test vehicle on the environment perception test platform and a second i-ECU 21, a second VCU 22, a second ECM 23, a second TCU 24, a second EPS 25, and a second SCS 26 on the test vehicle on the rotating hub test platform, and a sensor 11 is further disposed on the test vehicle on the environment perception test platform.

(2) A communication between the sensor 11 on the test vehicle on the environment perception test platform and the first i-ECU 12 is cut off, and the sensor is connected to the second i-ECU 21 on the test vehicle on the rotating hub test platform.

(3) A connection between a vehicle controller local area network bus formed by the first ECM 14, the first TCU 15, the first EPS system 16, and the first SCS 17 and the first VCU 13 is continuously cut off, and the first EPS system 16 is connected to the second VCU 22 on the test vehicle on the rotating hub test platform.

(4) A connection between the second EPS system 25 and the second VCU 22 on the test vehicle on the rotating hub test platform is cut off, that is, a vehicle data communication and interaction system is constructed.

The first EPS system 16 in (3) is communicatively connected to the second VCU 22 in a wired or wireless manner.

Embodiment 2

Figure 3:
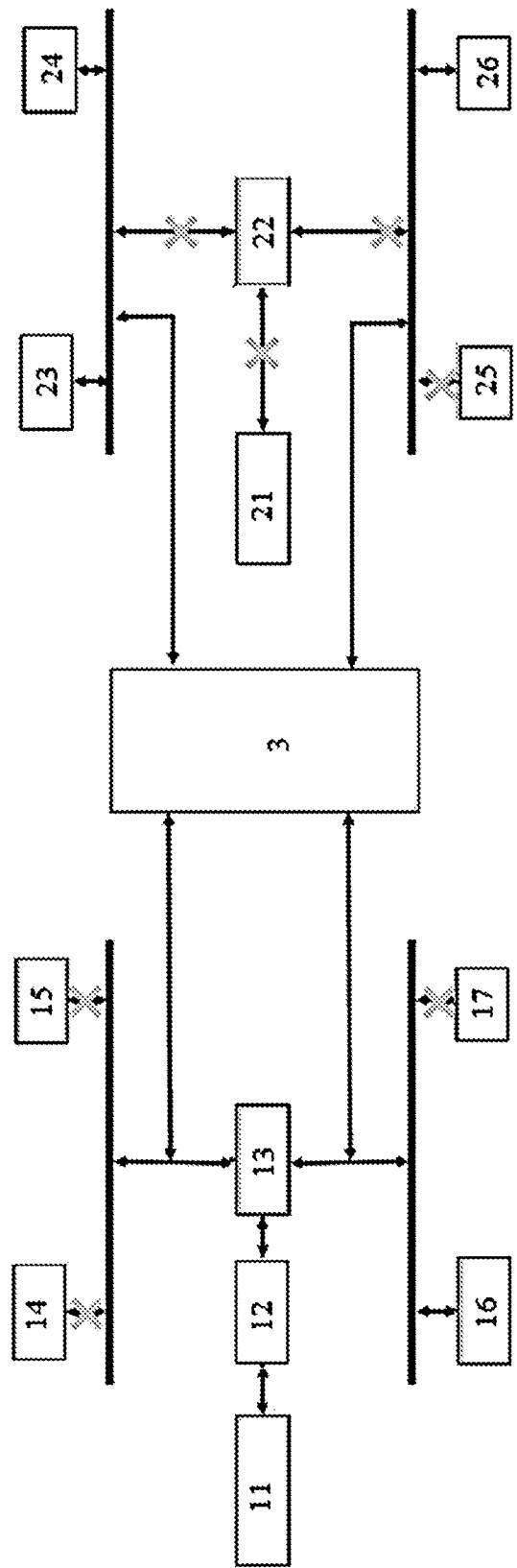
FIG. 3 is a schematic structural diagram of a vehicle data communication and interaction system according to Embodiment 2.

As shown in FIG. 3, a vehicle data communication and interaction system is provided, including a first test vehicle placed in an environment perception test platform and a second test vehicle placed in a rotating hub test platform, an i-ECU, a VCU, and a vehicle bottom electronic control unit that are communicatively connected with each other are mounted on each of the first test vehicle and the second test vehicle, the first test vehicle is communicatively connected to the second test vehicle via a network gateway 3, the network gateway 3 is mounted on the first test vehicle or the second test vehicle, and the vehicle bottom electronic control unit includes an ECM, a TCU, an EPS system, and an SCS.

Specifically, a sensor 11, a first i-ECU 12, a first VCU 13, a first ECM 14, a first TCU 15, a first EPS system 16, and a first SCS 17 are mounted on the first test vehicle, where the sensor 11, the first i-ECU 12, and the first VCU 13 are connected with each other in sequence, the first ECM 14 and the first TCU 15 are connected to the same communication bus and then are connected to the first VCU 13, and the first EPS system 16 and the first SCS 17 are connected to the same communication bus and then are connected to the first VCU 13.

A second i-ECU 21, a second VCU 22, a second ECM 23, a second TCU 24, a second EPS system 25, and a second SCS 26 are mounted on the second test vehicle, where the second i-ECU 21 is connected to the second VCU 22, the second ECM 23 and the second TCU 24 are connected to the same communication bus and then are connected to the second VCU 22, and the second EPS system 25 and the second SCS 26 are connected to the same communication bus and then are connected to the second VCU 22.

One end of the network gateway 3 is connected to the first VCU 13, and another end of the network gateway 3 is connected to the second ECM 23, the second TCU 24, and the second SCS 26.

Figure 4:
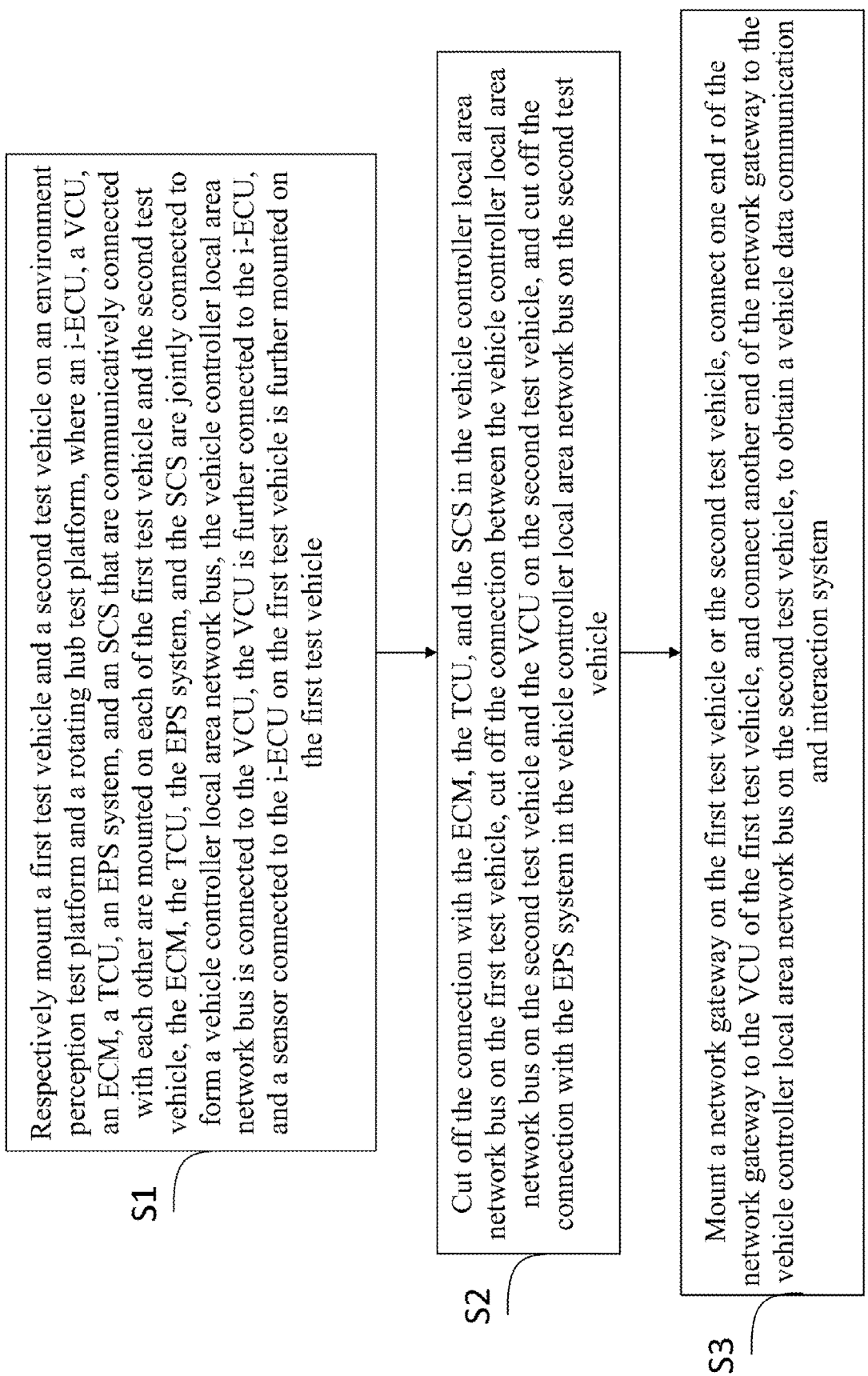
FIG. 4 is a schematic flowchart of a construction method for a vehicle data communication and interaction system according to Embodiment 2.

A flowchart of the construction method for a vehicle data communication and interaction system is shown in FIG. 4 and mainly includes the following steps.

S1. Respectively mount a first test vehicle and a second test vehicle on an environment perception test platform and a rotating hub test platform, where an i-ECU, a VCU, an ECM, a TCU, an EPS system, and an SCS that are communicatively connected with each other are mounted on each of the first test vehicle and the second test vehicle, the ECM, the TCU, the EPS system, and the SCS are jointly connected to form a vehicle controller local area network bus, the vehicle controller local area network bus is connected to the VCU, the VCU is further connected to the i-ECU, and a sensor connected to the i-ECU on the first test vehicle is further mounted on the first test vehicle.

S2. Cut off the connection with the ECM, the TCU, and the SCS in the vehicle controller local area network bus on the first test vehicle, cut off the connection between the vehicle controller local area network bus on the second test vehicle and the VCU on the second test vehicle, and cutting off the connection with the EPS system in the vehicle controller local area network bus on the second test vehicle.

S3. Mount a network gateway on the first test vehicle or the second test vehicle, connect one end of the network gateway to the VCU of the first test vehicle, and connect another end of the network gateway to the vehicle controller local area network bus on the second test vehicle, to obtain a vehicle data communication and interaction system.

A working process of applying the method in this embodiment is as follows.

(1) Test vehicles are respectively placed on an environment perception test platform and a rotating hub test platform, where each test vehicle includes an i-ECU, a VCU, an ECM, a TCU, an EPS system, and an SCS, which are respectively a first i-ECU 12, a first VCU 13, a first ECM 14, a first TCU 15, a first EPS system 16, and a first SCS 17 on the test vehicle on the environment perception test platform and a second i-ECU 21, a second VCU 22, a second ECM 23, a second TCU 24, a second EPS 25, and a second SCS 26 on the test vehicle on the rotating hub test platform, and a sensor 11 is further disposed on the test vehicle on the environment perception test platform.

(2) A communication connection between the first ECM 14, the first TCU 15, and the first SCS 17 on the test vehicle on the environment perception test platform and the first VCU 13 is cut off, and a connection between the second ECM 23, the second TCU 24, the second EPS system 25, and the second SCS 26 on the test vehicle on the rotating hub test platform and the second VCU 22 is cut off.

(3) A network gateway 3 is mounted on the test vehicle on the environment perception test platform or the test vehicle on the rotating hub test platform, then one end of the network gateway 3 is connected to the first VCU 13 on the test vehicle on the environment perception test platform, and another end of the network gateway 3 is connected to the second ECM 23, the second TCU 24, and the second SCS 26 on the test vehicle on the rotating hub test platform, that is, a vehicle data communication and interaction system is constructed.

What is claimed is:

1. A construction method for a vehicle data communication and interaction system, comprising following steps:
    S1: respectively mounting a first test vehicle and a second test vehicle on an environment perception test platform and a rotating hub test platform, wherein an intelligent-electronic control unit (i-ECU), a vehicle control unit (VCU), an engine control module (ECM), a transmission control unit (TCU), an electric power steering (EPS) system, and an stabilization control system (SCS) that are communicatively connected with each other are mounted on each of the first test vehicle and the second test vehicle, the ECM, the TCU, the EPS system, and the SCS are jointly connected to form a vehicle controller local area network bus, the vehicle controller local area network bus is connected to the VCU, the VCU is further connected to the i-ECU, and a sensor connected to the i-ECU on the first test vehicle is further mounted on the first test vehicle;
    S2: cutting off connection between the sensor on the first test vehicle and the i-ECU on the first test vehicle, and connecting the sensor on the first test vehicle to the i-ECU on the second test vehicle;
    S3: cutting off connection between the vehicle controller local area network bus on the first test vehicle and the VCU on the first test vehicle, and connecting the EPS system on the first test vehicle to the vehicle controller local area network bus on the second test vehicle; and
    S4: cutting off connection with the EPS system in the vehicle controller local area network bus on the second test vehicle, to obtain a vehicle data communication and interaction system.

2. The vehicle data communication and interaction system according to claim 1, wherein the vehicle controller local area network bus comprises a first communication bus and a second communication bus, the first communication bus is respectively connected to the ECM and the TCU, the second communication bus is respectively connected to the EPS system and the SCS, and the first communication bus and the second communication bus are further respectively connected to the VCU.

3. The vehicle data communication and interaction system according to claim 1, wherein in the step S3, the EPS system on the first test vehicle is connected to the vehicle controller local area network bus on the second test vehicle in a wired or wireless manner.

\* \* \* \* \*